United States Patent
Achan et al.

(10) Patent No.: US 11,288,700 B2
(45) Date of Patent: Mar. 29, 2022

(54) AUTOMATIC PERSONALIZED EMAIL TRIGGERS

(71) Applicant: Walmart Apollo, LLC, Bentonville, AR (US)

(72) Inventors: Kannan Achan, Saratoga, CA (US); Sushant Kumar, Sunnyvale, CA (US); Kaushiki Nag, Santa Clara, CA (US); Venkata Syam Prakash Rapaka, Cupertino, CA (US)

(73) Assignee: WALMART APOLLO, LLC, Bentonville, AR (US)

(*) Notice: Subject to any disclaimer, the term of this patent is extended or adjusted under 35 U.S.C. 154(b) by 92 days.

(21) Appl. No.: 16/259,626

(22) Filed: Jan. 28, 2019

(65) Prior Publication Data

US 2019/0236643 A1 Aug. 1, 2019

Related U.S. Application Data

(60) Provisional application No. 62/622,511, filed on Jan. 26, 2018.

(51) Int. Cl.
*G06Q 30/00* (2012.01)
*G06Q 30/02* (2012.01)
*G06N 7/00* (2006.01)

(52) U.S. Cl.
CPC ..... *G06Q 30/0246* (2013.01); *G06Q 30/0255* (2013.01); *G06Q 30/0271* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 8,364,540 | B2* | 1/2013 | Soroca | G06F 16/9577 705/14.64 |
| 8,429,190 | B2* | 4/2013 | Gutierrez | G06Q 10/107 707/781 |

(Continued)

FOREIGN PATENT DOCUMENTS

| | | | | |
|---|---|---|---|---|
| WO | WO2001039013 | | 5/2001 | |
| WO | WO-2007029116 A2* | | 3/2007 | H04L 51/22 |

(Continued)

OTHER PUBLICATIONS

Pam Dixon and Robert Gellman. The Scoring of America: How Secret Consumer Scores Threaten Your Privacy and Your Future. (Apr. 2, 2014). Retrieved online Jul. 12, 2021. https://www.ftc.gov/system/files/documents/public_comments/2014/08/00014-92369.pdf (Year: 2014).*

(Continued)

*Primary Examiner* — James A Reagan
(74) *Attorney, Agent, or Firm* — Bryan Cave Leighton Paisner LLP

(57) ABSTRACT

A method including tracking first data including responses by users to email campaigns. The method also can include generating a user feature set for the users, the user feature set including personal features of each of the users and online activity history for each of the users across a first set of time periods. The method additionally can include generating an email feature set for the emails in the email campaigns. The method further can include training a logistic regression model to create a trained model using the first data, the user feature set, and the email feature set to provide a probability of a user of the users clicking on an email of the emails within each time period of a second set of time periods. The method additionally can include triggering sending a first email of the email campaigns to a first user of the users at (Continued)

a selected time period of the second set of time periods based at least in part on the trained model. Other embodiments are disclosed.

20 Claims, 5 Drawing Sheets

(56) References Cited

U.S. PATENT DOCUMENTS

| | | | | |
|---|---|---|---|---|
| 8,515,937 | B1* | 8/2013 | Sun | G06Q 10/10 |
| | | | | 707/707 |
| 9,473,446 | B2* | 10/2016 | Vijay | G06Q 10/107 |
| 10,089,639 | B2* | 10/2018 | Kannan | G06F 16/958 |
| 10,169,779 | B2* | 1/2019 | Vohra | G06Q 30/0269 |
| 2002/0026356 | A1 | 2/2002 | Bergh et al. | |
| 2009/0172035 | A1* | 7/2009 | Lessing | G06Q 30/02 |
| 2011/0093393 | A1 | 4/2011 | Chang et al. | |
| 2012/0158710 | A1* | 6/2012 | Burges | G06F 16/3347 |
| | | | | 707/723 |
| 2013/0254035 | A1* | 9/2013 | Ramer | G06Q 30/0256 |
| | | | | 705/14.62 |
| 2013/0346264 | A1* | 12/2013 | Falkenborg | G06Q 40/10 |
| | | | | 705/30 |
| 2014/0207518 | A1* | 7/2014 | Kannan | G06Q 30/0201 |
| | | | | 705/7.29 |
| 2014/0289054 | A1* | 9/2014 | Capel | G06Q 30/0269 |
| | | | | 705/14.66 |
| 2015/0074215 | A1* | 3/2015 | Arquette | G06Q 30/02 |
| | | | | 709/206 |
| 2015/0127468 | A1* | 5/2015 | Yi | G06Q 30/0273 |
| | | | | 705/14.69 |
| 2015/0278864 | A1* | 10/2015 | McDevitt | G06Q 30/0261 |
| | | | | 705/14.58 |
| 2016/0034953 | A1 | 2/2016 | Wall et al. | |
| 2016/0269347 | A1 | 9/2016 | Arquette et al. | |
| 2017/0004531 | A1 | 1/2017 | Seetharama et al. | |
| 2017/0017971 | A1* | 1/2017 | Moreau | G06Q 30/0255 |
| 2017/0178252 | A1* | 6/2017 | Mehta | G06Q 50/01 |
| 2017/0317963 | A1* | 11/2017 | Gupta | G06N 3/08 |
| 2019/0139077 | A1* | 5/2019 | Thomas | G06Q 30/0242 |
| 2019/0139079 | A1* | 5/2019 | Nataf | G06Q 30/0254 |

FOREIGN PATENT DOCUMENTS

| | | | | |
|---|---|---|---|---|
| WO | WO-2008116419 | A1 * | 10/2008 | H04L 51/34 |
| WO | WO-2008127232 | A1 * | 10/2008 | H04L 51/38 |
| WO | WO-2010126205 | A1 * | 11/2010 | G06Q 30/02 |

OTHER PUBLICATIONS

IPullRank.com. Machine Learning for Marketers. (Oct. 15, 2015). Retrieved online Nov. 9, 2021. https://assets.ctfassets.net/j5zy0n17n2ql/2D4mX8PjV6iC6i8cluSCwk/23a4ebb99a6e9d5a82b2f03e1262f39d/ml-whitepaper.pdf (Year: 2015).*

McKinsey and Company. Marketing & Sales Big Data, Analytics, and the Future of Marketing & Sales. (Mar. 2015). Retrieved online Nov. 9, 2021. https://www.mckinsey.com/~/media/McKinsey/Business%20Functions/Marketing%20and%20Sales/Our%20Insights/EBook%20Big%20data%20analytics%20and%20the%20future%20of% (Year: 2015).*

* cited by examiner

AUTOMATIC PERSONALIZED EMAIL TRIGGERS

CROSS-REFERENCE TO RELATED APPLICATION

This application claims the benefit of U.S. Provisional Application No. 62/622,511, filed Jan. 26, 2018. U.S. Provisional Application No. 62/622,511 is incorporated herein by reference in its entirety.

TECHNICAL FIELD

This disclosure relates generally to generating automatic personalized email triggers.

BACKGROUND

Email has become a ubiquitous form of communication. Many emails are unopened, ignored, or disregarded by recipients of emails because the recipients receive too many emails, receive the emails at inappropriate times, or receive emails that are not relevant to their interests.

BRIEF DESCRIPTION OF THE DRAWINGS

To facilitate further description of the embodiments, the following drawings are provided in which.

Figure 1:
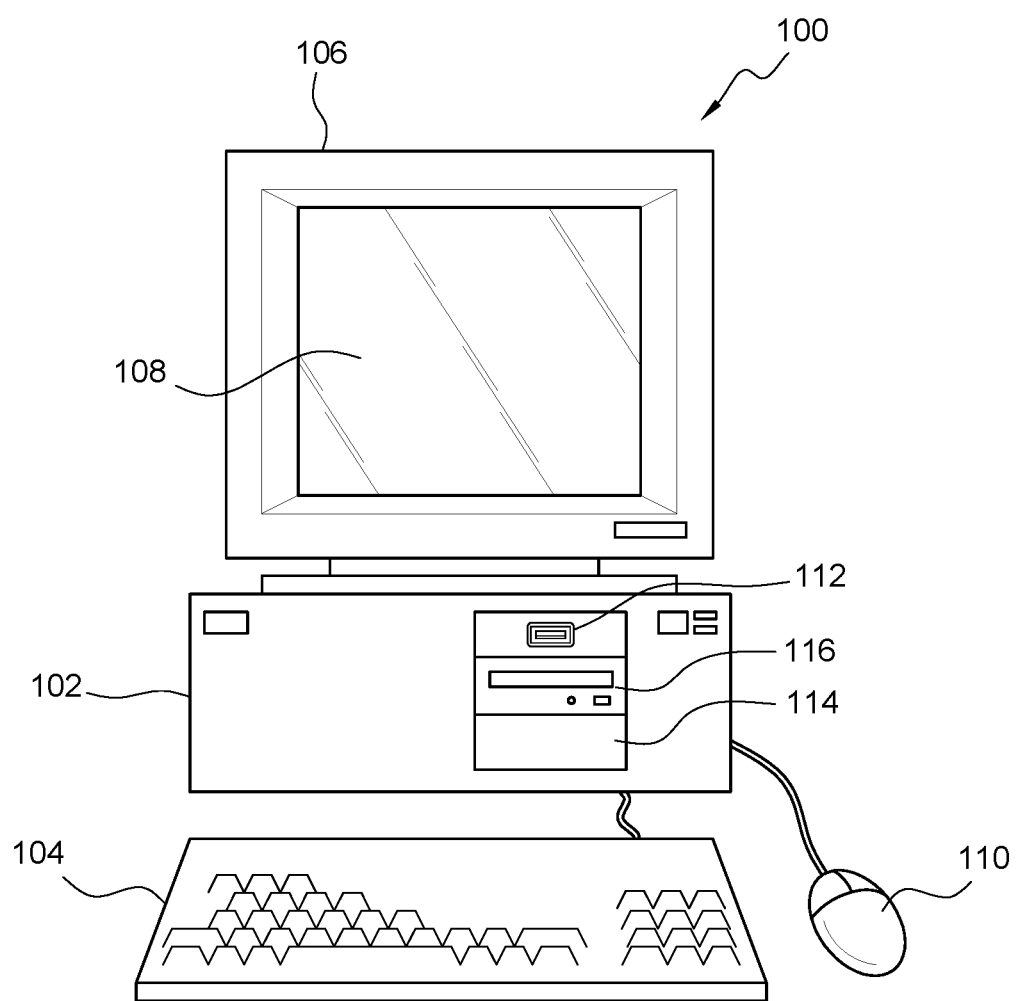
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, one hour, six hours, twelve hours, or twenty-four hours.

DESCRIPTION OF EXAMPLES OF EMBODIMENTS

Figure 2:
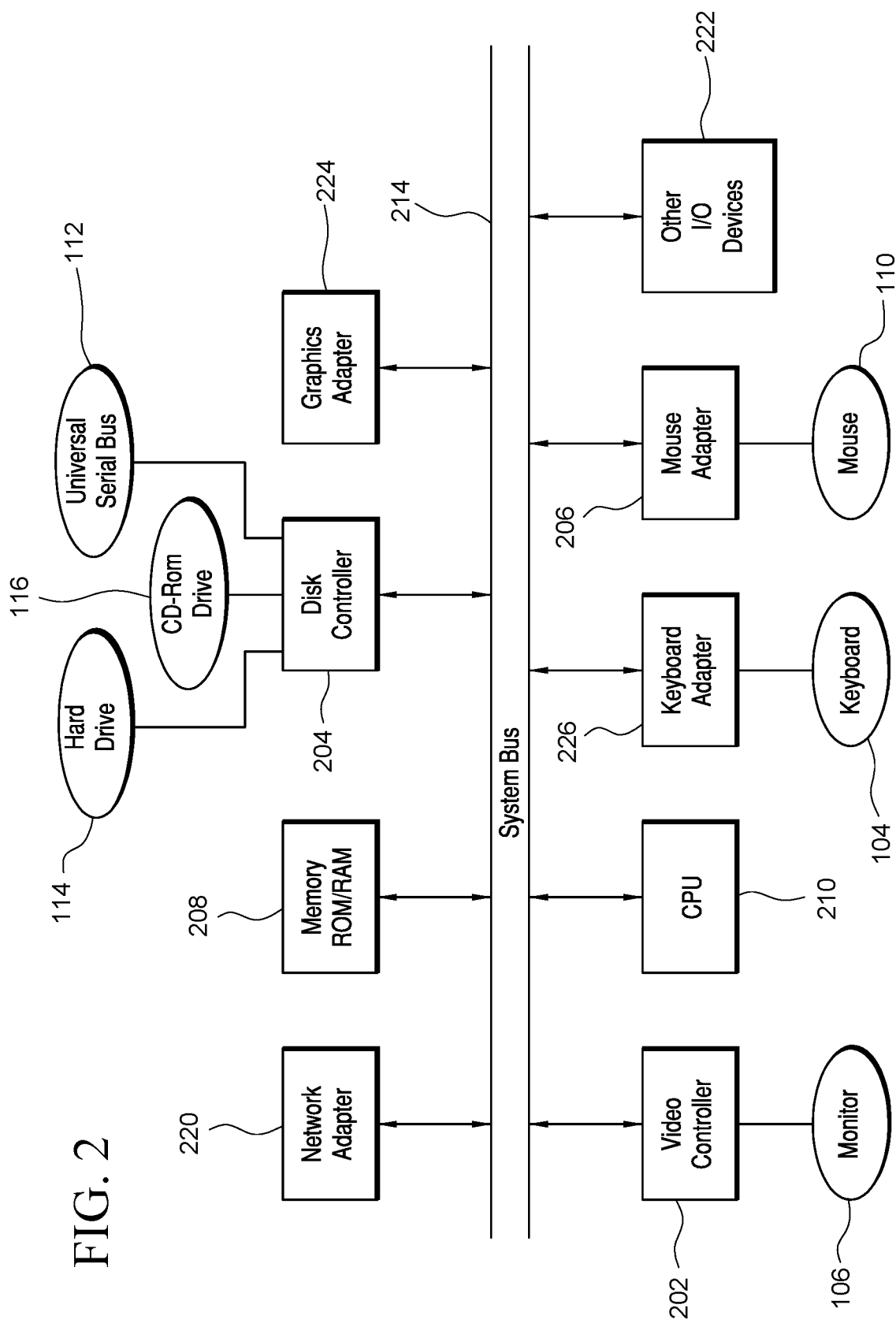
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif. United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
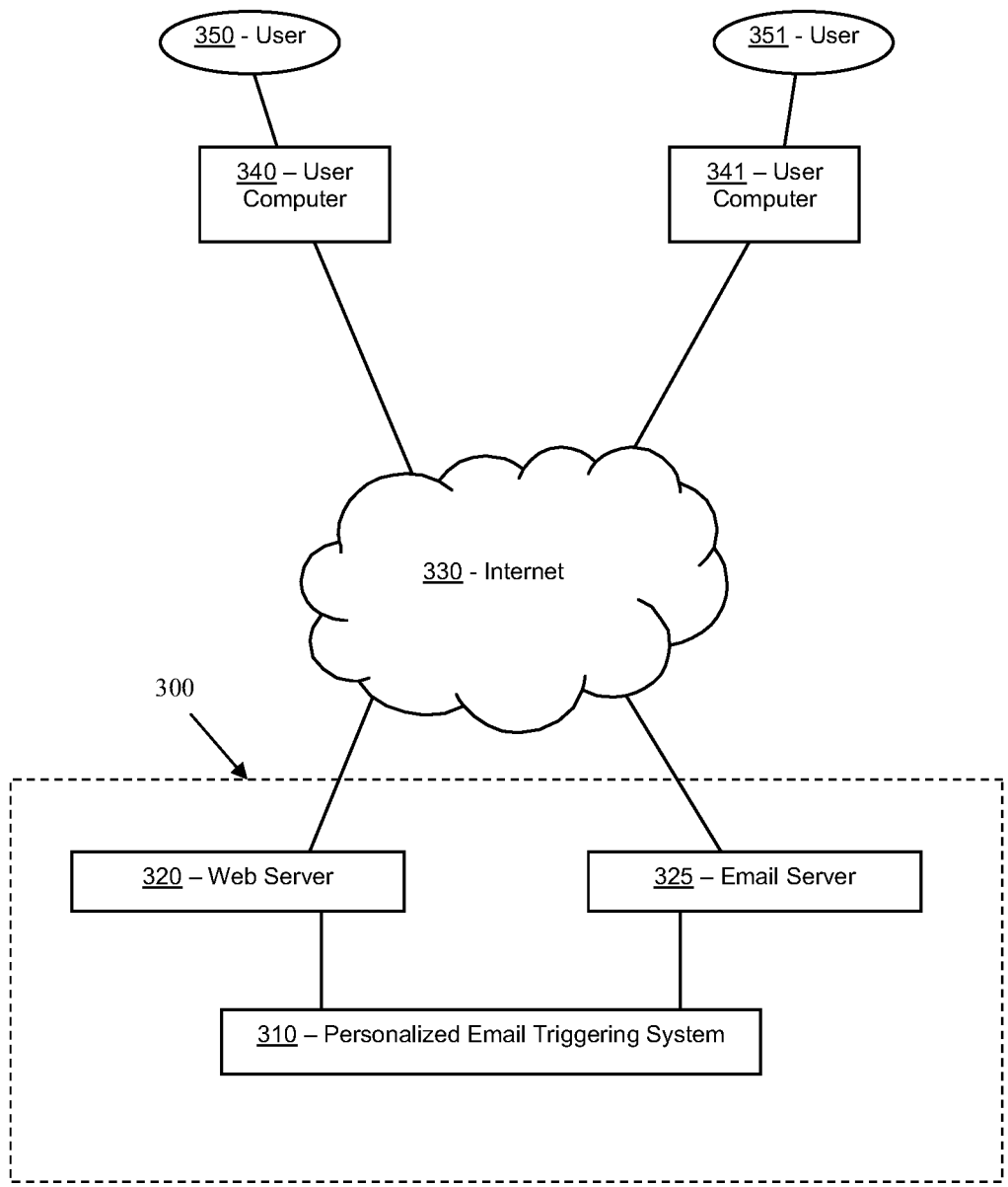
FIG. 3 illustrates a block diagram of a system that can be employed for personalizing email triggers, according to an embodiment.

Turning ahead in the drawings, FIG. 3 illustrates a block diagram of a system 300 that can be employed for personalizing email triggers, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a personalized email triggering system 310, web server 320, and/or email server 325.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Personalized email triggering system 310, web server 320, and/or email server 325 can each be a computer system, such as computer system 100 (FIG. 1), as described above, and can each be a single computer, a single server, or a cluster or collection of computers or servers, or a cloud of computers or servers. In another embodiment, a single computer system can host personalized email triggering system 310, web server 320, and/or email server 325. Additional details regarding personalized email triggering system 310, web server 320, and/or email server 325 are described herein.

In some embodiments, web server 320 and/or email server 325 can be in data communication through Internet 330 with one or more user computers, such as user computers 340 and/or 341. In some embodiments, user computers 340-341 can be used by users, such as users 350 and 351, which also can be referred to as customers, in which case, user computers 340 and 341 can be referred to as customer computers. In many embodiments, web server 320 can host one or more websites. For example, web server 320 can host a website that allows users to browse and/or search for items (e.g., products), to add items to an electronic cart, and/or to purchase items, in addition to other suitable activities.

In several embodiments, email server 325 can be a server that supports one or more email protocols, such as SMTP (Simple Mail Transfer Protocol), POP (Post Office Protocol), or IMAP (Internet Message Access Protocol). In many embodiments, email server 325 can send emails to the user computers (e.g., 340, 341). In many embodiments, the emails each can include one or more hyperlinks, which can allow the users (e.g., 350, 351) to take actions in response to receiving the emails, such as clicking on the one or more hyperlinks in the emails. For example, an email can include descriptions and/or depictions of one or more items (e.g., products) available at the website hosted by web server 320, along with a link to an item page at the website for each of the one or more items. The item page can be a webpage that is part of the website. The item page can provide a description of the item and/or can allow the user (e.g., 350-351) to add the item to an electronic cart at the website. In many embodiments, email server 325 can sent emails that support the HTML (Hypertext Markup Language) standard.

In some embodiments, an internal network that is not open to the public can be used for communications between personalized email triggering system 310, web server 320, and/or email server 325 within system 300. Accordingly, in some embodiments, personalized email triggering system 310 (and/or the software used by such systems) can refer to a back end of system 300 operated by an operator and/or administrator of system 300, and web server 320 and/or email server 325 (and/or the software used by such systems) can refer to a front end of system 300, as is can be accessed and/or used by one or more users, such as users 350-351, using user computers 340-341, respectively. In these or other embodiments, the operator and/or administrator of system 300 can manage system 300, the processor(s) of system 300, and/or the memory storage unit(s) of system 300 using the input device(s) and/or display device(s) of system 300.

In certain embodiments, user computers 340-341 can be desktop computers, laptop computers, a mobile device, and/or other endpoint devices used by one or more users 350 and 351, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M1000™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, personalized email triggering system 310, web server 320, and/or email server 325 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to personalized email triggering system 310, web server 320, and/or email server 325 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of personalized email triggering system 310, web server 320, and/or email server 325. In a similar manner, the processors and/or the non-transitory computer-readable media can be local and/or remote to each other.

Meanwhile, in many embodiments, personalized email triggering system 310, web server 320, and/or email server 325 also can be configured to communicate with one or more databases. The one or more databases can include a product database that contains information about products, items, or SKUs (stock keeping units), for example. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between personalized email triggering system 310, web server 320, and/or email server 325, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Conventionally, email campaigns are often used to send emails to users (e.g., 350, 351) to inform the users (e.g., 350, 351) of special promotions and/or discounted items available on the website hosted by web server 320, and/or to remind the users (e.g., 350, 351) of items that are in the electronic cart of the user at the website. Email campaigns can make the online experience easier for the users (e.g., 350, 351), because the users (e.g., 350, 351) can learn about special promotions or discounted items without the need to keep checking the website for updates and/or promotions.

For example, if a user (e.g., 350, 351) is interested in purchasing a television (TV) and the user (e.g., 350, 351) adds the TV to the electronic cart for the user (e.g., 350, 351) at the website, an email can be sent to the user (e.g., 350, 351) when the price of the TV in the cart decreases, or when there is a special promotion or discount on another TV, and the email contains one or more links to these one or more items. As another example, some conventional email campaigns send an email to a user (e.g., 350, 351) that has one or more items in the electronic cart of the user (e.g., 350, 351) when the price of at least one of the items is more than a certain amount (e.g., more than $20), and the email contains a link to the item page of the items and/or the cart. As yet another example, certain conventional email campaigns send an email to users (e.g., 350, 351) that have looked at items on the website for more than a certain amount of time, and the email contains a link to these items. As a further example, some conventional email campaigns send an email to a user (e.g., 350, 351) that has purchase an item (e.g., a TV), and the email contains links to items in categories that are correlated with the recently purchased items (e.g., TV stands and TV sound systems to go with the TV).

A challenge with email campaigns is knowing when and how often to send emails to users (e.g., 350, 351), and to make the emails relevant to the users. For example, if a user (e.g., 350, 351) is sent several emails containing products that are not relevant to the user (e.g., 350, 351), the user is unlikely to click on the items in the emails. Moreover, the user can become dissatisfied with the emails, which can lead to the user not opening future emails and/or unsubscribing from receiving future emails. The timing of the emails can affect the likelihood of the users (e.g., 350, 351) to click on the items in the email and/or affect the satisfaction of the users (e.g., 350, 351). For example, if a user (e.g., 350, 351) purchases a recurring item (i.e., that the user (e.g., 350, 351) purchases at a regular interval), such as toilet paper every 15 days, the timing of an email containing a link to the item can affect the effectiveness of whether the user (e.g., 350, 351) will click on the item in the email or ignore it, and can affect the satisfaction of the user with respect to email campaigns from the entity operating the website. The challenge of improving the effectiveness of email campaigns thus involves determining which items are the most relevant to the users (e.g., 350, 351) and when the timing is appropriate to send the emails promoting those items to the users (e.g., 350, 351).

In many embodiments, system 300 advantageously can determine which items are the most relevant to the users (e.g., 350, 351) and when the timing is appropriate to send the emails promoting those items to the users (e.g., 350, 351). In a number of embodiments, system 300 beneficially can train a model, which can predict a time (e.g., an optimal time) and email campaign to send to a user (e.g., 350, 351) in order to increase the likelihood that the user (e.g., 350, 351) will click on a link in an email to return to the website. In order to train the model, past emails that were sent to users (e.g., 350, 351) can be used as indicators of effectiveness. For example, if an email was clicked to visit the website, the email can be used as a positive indicator, and if the email was not clicked, the email can be used as a negative indicator.

In several embodiments, the model beneficially can identify a time and set of actions by a user (e.g., 350, 351) that indicate a high probability (e.g., above a threshold probability) of a click by the user (e.g., 350, 351) when an email is sent to the user (e.g., 350, 351). In order to identify which set of actions by the user (e.g., 350, 351) indicate that it is an appropriate time to send the email, past email campaign logs can be used to generate training data to train the model. The browsing history of the user (e.g., 350, 351) and the content of the emails can be tracked and represented in a temporal context. These representations can be used in the model to predict the likelihood of a user (e.g., 350, 351) clicking on specific items during specific time periods.

As an example, if a user (e.g., 350, 351) purchased a TV from the website today and browsed through some TV stands on the website, but the user (e.g., 350, 351) did not purchase any TV stands or accessories. If three of the TV stands on the website are discounted two days later, the model can predict that, given the price affinity, an intent to purchase TV-related accessories for the user (e.g., 350, 351) is very strong, such that this will be an appropriate time to send the user (e.g., 350, 351) an email that includes these items.

As another example, if a user (e.g., 350, 351) purchased toilet paper, the model can predict that suggesting toilet paper immediately through an email is unlikely to be effective at leading to a click on the email. Based on the behavior of the user (e.g., 350, 351) with toilet paper in the past, however, the model can suggest sending an email reminder to the user (e.g., 350, 351) to buy more toilet paper 15 days after the initial purchase, and that this timing has a sufficiently likelihood of resulting in a click on the email by the user (e.g., 350, 351).

Figure 4:
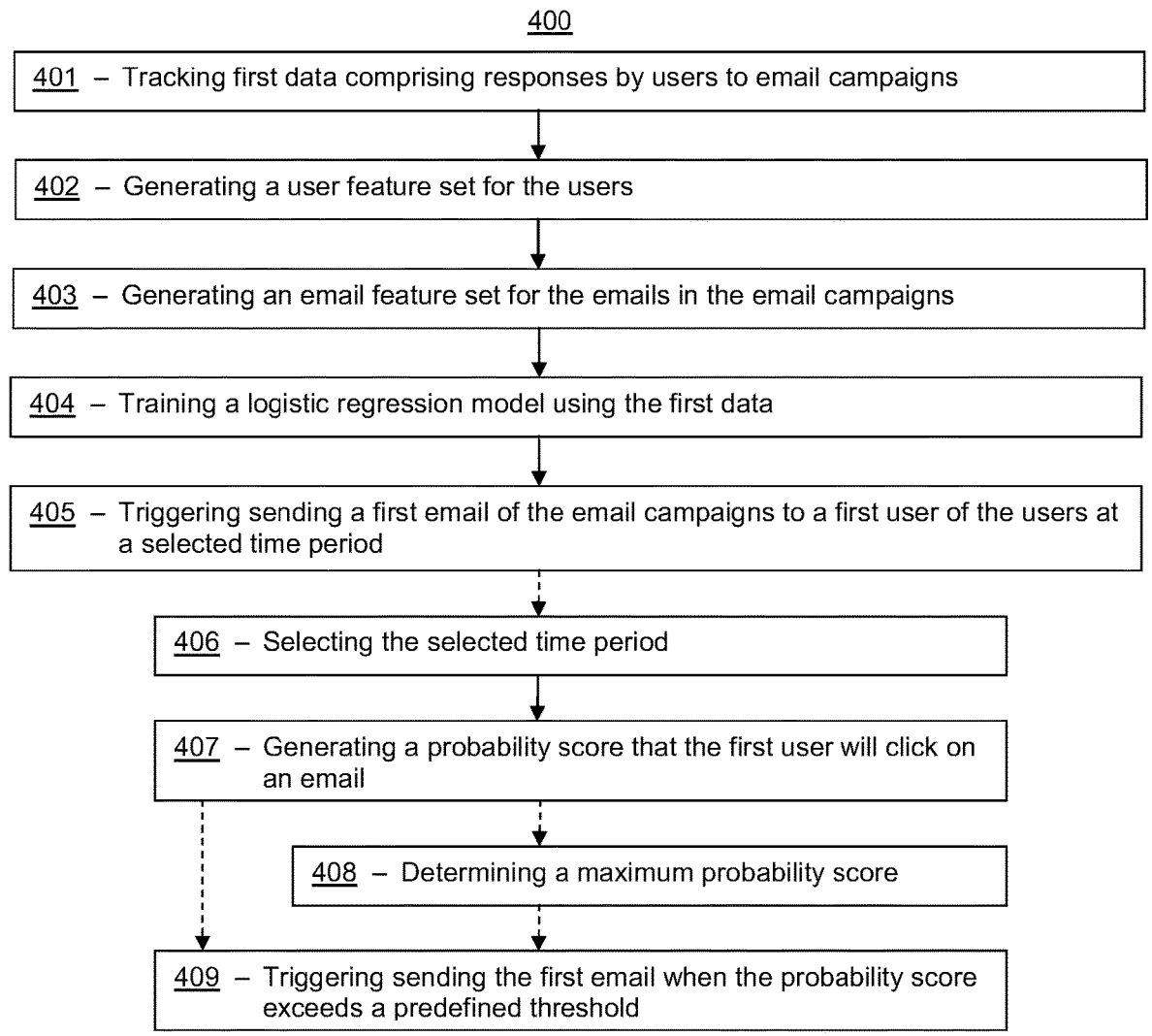
FIG. 4 illustrates a flow chart for a method, according to an embodiment.

Turning ahead in the drawings, FIG. 4 illustrates a flow chart for a method 400, according to an embodiment. In some embodiments, method 400 can be a method of automatic personalized email triggers. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as personalized email triggering system 310, web server 320, and/or email server 325. The processor(s) can be similar or identical to the processor(s) described above with respect to computer system 100 (FIG. 1).

In some embodiments, method 400 and other blocks in method 400 can include using a distributed network including distributed memory architecture to perform the associated activity. This distributed architecture can reduce the impact on the network and system resources to reduce congestion in bottlenecks while still allowing data to be accessible from a central location.

Referring to FIG. 4, method 400 can include a block 401 of tracking first data comprising responses by users to email campaigns. The users can be similar or identical to users (e.g., 350, 351 (FIG. 3)). In many embodiments, each of the responses can include whether or not a user of the users clicked on an email of the email campaigns. For example, the first data can log, for each user that is sent an email, whether or not the user clicked on a link in the email to go to a website, such as the website hosted by web server 320 (FIG. 3).

In several embodiments, method 400 also can include a block 402 of generating a user feature set for the users. In many embodiments, the user feature set can include personal features of each of the users and online activity history for each of the users across a first set of time periods. In some embodiments, the personal features of each of the users can include an age of the user, a gender of the user, a location of the user, a brand affinity of the user, a price affinity of the user, and/or other personal features of the user. In many embodiments, these personal features can be determined based on information provided by the user when the user registers at the website, information provided by the user when the user makes a payment through the website, the browsing history of the user (e.g., the items (including the brands and/or the prices of the items) that the user has looked at, added to cart, and/or purchased in the past, and/or other browsing history), the in-store history of the user at brick-and-mortar stores associated with the website (e.g., the brands and/or the prices of items purchased in brick-and-mortar stores, price scans done in brick-and-mortar stores using a mobile application associated with the website, and/or other suitable in-store history), and/or other suitable sources of information. For example, additional sources of information for personalized features for the user can be engagements tracked on other websites outside of the website hosted by web server 320 (FIG. 3), such as by online advertisements on other websites tracking the webpages viewed by the user. For example, a user can read an article at a consumer review website about a particular brand of TV sound system, and the interest of the user in that particular brand of TV sound systems can be tracked and included as a personalized feature for that user in the user feature set.

In some embodiments, the online activity history for each of the users can include add-to-carts, purchases, search activity, and/or item views in a category context. For example, a category can be TV sound systems, such that an add-to-cart of a TV sound system can be tracked as an add-to-cart in the category of TV sound systems. In many embodiments, the online activity history for each of the users can include, for a last (e.g., most recent) online session of the user, a time of the last online session, a cart state after the last online session, a last (e.g., most recent) action performed by the user in the last online session, and/or other suitable information about the last online session of the user. For example, the last action performed can be an item page view of a particular item in a particular category, having a particular brand, at a particular price. In several embodiments, the online activity can be categorized across the first set of time periods. In a number of embodiments, the first set of time periods can include a first time period for the past 60 days, a second time period for the past 30 days, a third time period for the past 7 days, a fourth time period for the past 1 day, and a fifth time period for a current online session. In other embodiments, other suitable time periods can be used.

In a number of embodiments, method 400 additionally can include a block 403 of generating an email feature set for the emails in the email campaigns. In many embodiments, each email of the email campaigns can include one or more hyperlinks to one or more items. For example, the items can be products listed on the website hosted by web server 320 (FIG. 3). The combination of one or more items listed in each of the emails can be different. For example, one email can include links to items A and B, another email can include a link to item A alone, and yet another email can include a link to item C. In many embodiments, each particular email was sent to a quantity of users, which can be between 1 user and the total number of users. Typically, an email is targeted at certain characteristics of the users, such as gender, age, location, etc., and thus sent to a subset of the total number of users registered with the website hosted by web server 320 (FIG. 3). In several embodiments, the email feature set can include a time sent for each of the emails in the email campaigns. For example, if an email was sent at a particular time, that particular time can be tracked and included in the email feature set.

In some embodiments, the email feature set further can include, for each of the emails in the email campaigns, a category of the items featured in the email, a location to which the email was sent, a gender to which the email was sent, one or more brands of the one of more items featured in the email, one or more discount values of the one or more items featured in the email, one or more special promotional values of the one or more items featured in the email, and/or other suitable information about the email.

In several embodiments, method 400 further can include a block 404 of training a logistic regression model to create a trained model using the first data, the user feature set, and the email feature set to provide a probability of a user of the users clicking on an email of the emails within each time period of a second set of time periods. In many embodiments, the features in the user feature set and the email feature set can be the features (e.g., predictor variables) used in the regression. The objective function for the logistic regression model can be the dependent variable of whether or not the user clicked on the email. The training data used to train the logistic regression thus can include the portions of the user feature set and the email feature set that correspond to the first data, as the first data provides the output training data about whether the user clicked on the email. In many embodiments, the logistic regression model can be trained within each time period of the second set of time periods. In some embodiments, the second set of time periods can include a set of daily time periods (e.g., email sent within 1 day, 2 days, 3 days, 4 days, etc.). In other embodiments, the second set of time periods can be a set of other time periods. For example, the second set of time periods can be similar or identical to the first set of time periods, hourly time periods, half-day time periods, or other suitable time periods.

In many embodiments, the logistic regression model can be trained to the objective function of whether or not a given user will click on a given email if it were sent to the user at each of the time periods of the second set of time periods (e.g., at each day for t days). The time periods of the second time periods can be measured from after the last session of the user. For example, if the last session of the user was 2 days ago, then a time of 3 days would mean tomorrow. For each of the t time periods, the training of the logistic regression model can involve deriving the coefficients/weightings for each of the features in the user feature set and email feature set, based on the training data provided. Using these weightings, the model can give a probability of the user clicking on the email for each of the second set of time periods.

In a number of embodiments, method 400 additionally can include a block 405 of triggering sending a first email of the email campaigns to a first user of the users at a selected time period of the second set of time periods based at least in part on the trained model. In many embodiments, the logistic regression model trained in block 404 can be used to determine which email (e.g., the first email) to be sent to a particular user (e.g., the first user) at which time period (e.g., the selected time period). In some embodiments, block 405 can be implemented as described in blocks 406-409 below. In other embodiments, block 405 can be implemented using other suitable approaches based on the logistic regression model trained in block 404. As an example, the first data (e.g., training data) corresponds to only a subset of the combinations of user, email, and time. The other combinations of user, email, and time period for which there is no training data can be applied using the trained logistic regression model to determine the probability of the user clicking on the email at the time period. This probability score can then be used to determine whether to send the email to the user at the time period, such as by determining whether the probability score exceeds a predefined threshold probability score, for example.

In several embodiments, block 405 of triggering sending a first email of the email campaigns to a first user of the users at a selected time period of the second set of time periods based at least in part on the logistic regression model can include a block 406 of selecting the selected time period from among the second set of time periods. In many embodiments, each of the time periods, t, in the second set of time periods can be selected for deriving the probability score, as described below in block 407.

In a number of embodiments, block 405 of triggering sending a first email of the email campaigns to a first user of the users at a selected time period of the second set of time periods based at least in part on the logistic regression model also can include a block 407 of generating a probability score that the first user will click on an email for each of the emails of the email campaigns at the selected time period, using the logistic regression model. For example, a probability score (S) can be derived for each combination of email (E), user (C), and time period (t), as follows:

$$S_{Ect}=P(y=\text{clickOnEmail}|C_F E_F t)$$

where $t \in \{0 \ldots t\}$, $C_F$ is the user feature set, $E_F$ is the email feature set, and t is the time period, using the coefficients/weightings derived for the features in the user feature set and the email feature set.

In several embodiments, block 405 of triggering sending a first email of the email campaigns to a first user of the users at a selected time period of the second set of time periods based at least in part on the logistic regression model optionally can include a block 408 of determining a maximum probability score. In some embodiments, the maximum probability score can be determined from among the probability scores across the emails of the email campaigns for the selected time period. The maximum probability score, $P_t$, across n emails for a given user (C) at each selected time period t can be determined as follows:

$$P_t = \underset{i \in n}{\mathrm{argmax}} E_i * S_{iCt}$$

where S is the probability score for derived for the combination of email ($E_i$), user (C), and time (t). In some embodiments, the email that corresponds to the maximum probability score can be designated as the first email. In many embodiments, the maximum probability score, $P_t$, can be derived for each time period, t, for the given user (C).

In a number of embodiments, block 405 of triggering sending a first email of the email campaigns to a first user of the users at a selected time period of the second set of time periods based at least in part on the logistic regression model additionally can include a block 409 of triggering sending the first email to the first user at the selected time period when the probability score that the first user will click on the first email at the selected time period exceeds a predefined threshold probability score. As explained above, the time periods of the second time periods can be measured from after the last session of the user. For example, if the last session of the user was today, then a selected time period of 0 days would be today, and a selected time period of 3 days would mean in three days after today. In some cases, the selected time period can be the current time period (e.g., today, this hour, etc.), which can result in an email sent immediately or during the current time period, and in other cases, the selected time period can be in the future, such that the email can be sent during the selected time period in the future.

In some embodiments, block 408 can be used to identify the email with the maximum probability score for a given user during a given time period, and that maximum probability score can be evaluated in block 409 to determine if it exceeds the predefined threshold probability score, in which case sending the email can be triggered to be sent during time period t. In other embodiments, the determination of the maximum probability score in block 408 can be omitted, and the probability scores for each of the emails for a given user and time period can be evaluated against the predefined threshold probability score, and each of the emails that have a corresponding probability score that exceed the predefined threshold probability can be sent. In some embodiments, if more than a predefined number of emails (e.g., 2, 3, 4, or 5, for example) would be triggered to be sent during time period t, the number of emails triggered can be limited to that predefined number. In other embodiments, each of the emails can be triggered to be sent during time period t.

Figure 5:
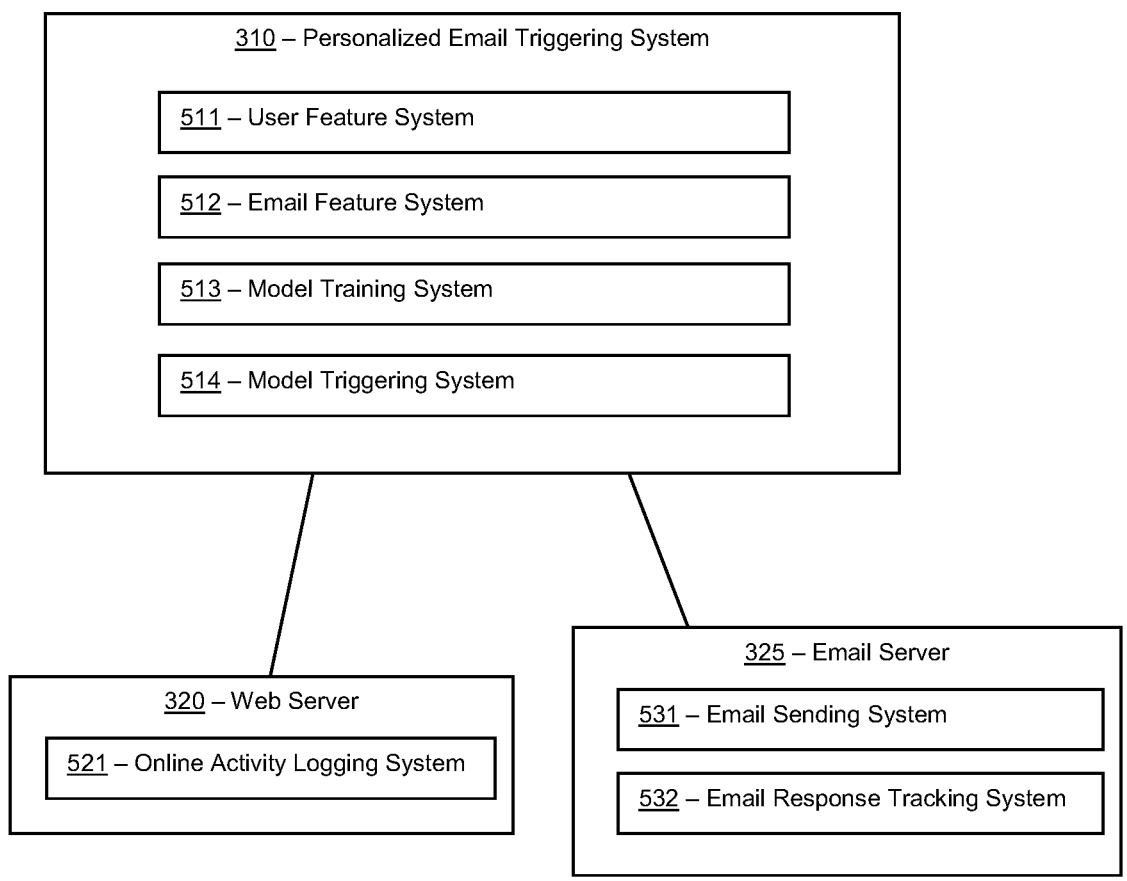
FIG. 5 illustrates a block diagram of system, according to the embodiment shown in FIG. 3.

Turning ahead in the drawings, FIG. 5 illustrates a block diagram of system 300, according to the embodiment shown in FIG. 3. Personalized email triggering system 310, web server 320, and/or an email server 325 are merely exemplary and are not limited to the embodiments presented herein. Personalized email triggering system 310, web server 320, and/or email server 325 can be employed in many different embodiments or examples not specifically depicted or described herein. In some embodiments, certain elements or system of personalized email triggering system 310, web server 320, and/or email server 325 can perform various procedures, processes, and/or acts. In other embodiments, the procedures, processes, and/or acts can be performed by other suitable elements or systems. In many embodiments, the systems of personalized email triggering system 310, web server 320, and/or email server 325 can be modules of computing instructions (e.g., software modules) stored at non-transitory computer readable media. In other embodiments, the systems of personalized email triggering system 310, web server 320, and/or email server 325 can be implemented in hardware.

In many embodiments, personalized email triggering system 310 can include a user feature system 511. In certain embodiments, user feature system 511 can at least partially perform block 402 (FIG. 4) of generating a user feature set for the users.

In a number of embodiments, personalized email triggering system 310 can include an email feature system 512. In certain embodiments, email feature system 512 can at least partially perform block 403 (FIG. 4) of generating an email feature set for the emails in the email campaigns.

In many of embodiments, personalized email triggering system 310 can include a model training system 513. In certain embodiments, model training system 513 can at least partially perform block 404 (FIG. 4) of training a logistic regression model using the first data In a number of embodiments, personalized email triggering system 310 can include a model triggering system 514. In certain embodiments, model triggering system 514 can at least partially perform block 405 (FIG. 4) of triggering sending a first email of the email campaigns to a first user of the users at a selected time period of the second set of time periods based at least in part on the logistic regression model, block 406 (FIG. 4) of selecting the selected time period from among the second set of time periods, block 407 (FIG. 4) of generating a probability score that the first user will click on an email for each of the emails of the email campaigns at the selected time period, using the logistic regression model, block 408 (FIG. 4) of determining a maximum probability score, and/or block 409 (FIG. 4) of triggering sending the first email to the first user at the selected time period when the probability score that the first user will click on the first email at the selected time period exceeds a predefined threshold probability score.

In a number of embodiments, web server 320 can include an online activity logging system 521. In certain embodiments, online activity logging system 521 can at least partially perform gathering the information provided to user feature system 511 to generate the user feature set.

In a number of embodiments, email server 325 can include an email sending system 531. In certain embodiments, email sending system 531 can at least partially perform gathering the information provided to email feature system 512 to generate the email feature set, and/or sending the emails that are triggered by model triggering system 514.

In a number of embodiments, email server 325 can include an email response tracking system 532. In certain embodiments, email response tracking system 532 can at least partially perform block 401 (FIG. 4) of tracking first data comprising responses by users to email campaigns.

In many embodiments, the techniques described herein can provide a practical application and several technological improvements. Specifically, the techniques described herein provide for training and using a logistic regression model to automatically determine, based on personal features of a given user, which email to send and when to send the email to the user. This approach is different from previous approaches, which applied subjective human manual determinations, and/or did not involve both levels of personalization to the user (e.g., which email to send the user and at what time to send the email to the user). This level of personalization of the emails sent to a user does not exist in conventional approaches to targeted emails to particular groups. Moreover, this level of personalization in the timing of when the user is sent the email does not exist in conventional approaches, which typically send the emails to each user a present time after a certain action, or to all of a group of users at the same time after a certain event (e.g., after a price discount).

Additionally, the techniques described herein can run continuously based on new information and data continually being received from actions of users (e.g., 350-351 (FIG. 3)) on the website hosted by web server 320 (FIG. 3) and the responses to the users (e.g., 350-351 (FIG. 3)) to the emails that continue to get sent out. In many embodiments, running these techniques continually (e.g., hourly, daily, etc.) can provide real-time determinations of which email and at what time to send the email to a particular user, based on the user's current activity (e.g., within the last hour, day, etc.) on the website and based on the activity of other users on the website and responses of other users to the emails within the last hour, day, etc.

In many embodiments, the techniques described herein can be used regularly (e.g., hourly, daily, etc.) at a scale that cannot be handled using manual techniques. For example, the number of monthly visits to the website can exceed one hundred million, and the number of registered users to the website can exceed ten million.

In a number of embodiments, the techniques described herein can solve a technical problem that cannot be solved using more conventional forms of advertising, such as direct mail via the United States Postal Service. In fact, the techniques described herein cannot be applied to such conventional forms of advertising because the logistic regression model cannot be trained, in view of a lack of data. For example, it would not be possible to know whether a recipient of the direct mail reviewed the direct mail and typed the web address on the direct mail into the recipient's web browser to view a web page, or whether the recipient instead happened to view that web page due to another reason and/or another referral source.

Various embodiments can include a system including one or more processors and one or more non-transitory computer-readable media storing computing instructions configured to run on the one more processors and perform certain acts. The acts can include tracking first data including responses by users to email campaigns. Each of the responses can include whether or not a user of the users clicked on an email of the email campaigns. The acts also can include generating a user feature set for the users, the user feature set including personal features of each of the users and online activity history for each of the users across a first set of time periods. The acts additionally can include generating an email feature set for the emails in the email campaigns. The email feature set can include a time sent for each of the emails in the email campaigns. The acts further can include training a logistic regression model to create a trained model using the first data, the user feature set, and the email feature set to provide a probability of a user of the users clicking on an email of the emails within each time period of a second set of time periods. The acts additionally can include triggering sending a first email of the email campaigns to a first user of the users at a selected time period of the second set of time periods based at least in part on the trained model.

A number of embodiments can include a method being implemented via execution of computing instructions configured to run at one or more processors and stored at one or more non-transitory computer-readable media. The method can include tracking first data including responses by users to email campaigns. Each of the responses can include whether or not a user of the users clicked on an email of the email campaigns. The method also can include generating a user feature set for the users, the user feature set including personal features of each of the users and online activity history for each of the users across a first set of time periods. The method additionally can include generating an email feature set for the emails in the email campaigns. The email feature set can include a time sent for each of the emails in the email campaigns. The method further can include training a logistic regression model to create a trained model using the first data, the user feature set, and the email feature set to provide a probability of a user of the users clicking on an email of the emails within each time period of a second set of time periods. The method additionally can include triggering sending a first email of the email campaigns to a first user of the users at a selected time period of the second set of time periods based at least in part on the trained model.

Although automatic personalized email triggers has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders. As another example, the systems within personalized email triggering system 310, web server 320, and/or email server 325 in FIG. 5 can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions configured to run on the one or more processors and perform:
  tracking first data comprising responses by users to email campaigns, each of the responses comprising whether or not a user of the users clicked on an email of the email campaigns;
  generating a user feature set for the users, the user feature set comprising personal features of each of the users and online activity history for each of the users across a first set of time periods comprising multiple different time periods, wherein the personal features of each of the users in the user feature set comprise, for each of the multiple different time periods, a location of the user, a brand affinity of the user, and a price affinity of the user;
  generating an email feature set for multiple different emails in the email campaigns, the email feature set comprising a respective time sent for each of the multiple different emails in the email campaigns, wherein the email feature set further comprises, for each of the multiple different emails in the email campaigns: a category of one or more items featured in the email, one or more brands of the one or more items featured in the email, and at least one of one or more discount values of the one or more items featured in the email or one or more special promotional values of the one or more items featured in the email;
  training a logistic regression model to create a trained model using the first data, the user feature set, and the email feature set to provide a probability of a user of the users clicking on an email of the multiple different emails within each time period of a second set of time periods, further comprising:
    for a past email of the email campaigns sent within a time period of the second set of time periods, training the logistic regression model using (a) the user feature set for the past email and the email feature set for the past email as input predictor variables for the logistic regression model, and (b) the first data for the past email as an output dependent variable for the logistic regression model; and
  triggering sending a first email of the email campaigns to a first user of the users at a selected time period of the second set of time periods based at least in part on the trained model, further comprising:
    determining a maximum probability score from among probability scores across the multiple different emails of the email campaigns for the selected time period, wherein the first email corresponds to the maximum probability score, and wherein the maximum probability score represents a probability of the first user clicking on the first email within the selected time period; and triggering sending the first email to the first user at the selected time period when the maximum probability score exceeds a predefined threshold probability score.

2. The system of claim 1, wherein the online activity history for each of the users comprises at least one of: add-to-carts, purchases, search activity, or item views in a category context.

3. The system of claim 1, wherein the online activity history for each user of the users comprises, for a last online website session of the each user, at least one of: a time of the last online website session, a cart state after the last online website session, or a last action performed by the each user in the last online website session.

4. The system of claim 1, wherein the first set of time periods comprises a first time period for a past 60 days, a second time period for a past 30 days, a third time period for a past 7 days, a fourth time period for a past 1 day, and a fifth time period for a current online session.

5. The system of claim 1, wherein the personal features of the each of the users further comprises: an age of the user, and a gender of the user.

6. The system of claim 1, wherein each respective email of the multiple different emails of the email campaigns comprises one or more hyperlinks to the one or more items.

7. The system of claim 6, wherein the email feature set further comprises, for the each respective email of the multiple different emails in the email campaigns: a location to which the each respective email was sent, or a gender to which the each respective email was sent.

8. The system of claim 1, wherein triggering sending the first email to the first user at the selected time period comprises:
   selecting the selected time period from among the second set of time periods; and
   generating a probability score that the first user will click on an email for each of the multiple different emails of the email campaigns at the selected time period, using the logistic regression model.

9. The system of claim 1, wherein the personal features of the each of the users is determined based at least in part a purchase history of each of the users at brick-and-mortar stores.

10. The system of claim 1, wherein the email feature set further comprises, for each of the multiple different emails in the email campaigns: one or more discount values of the one or more items featured in the email and one or more special promotional values of the one or more items featured in the email.

11. A method being implemented via execution of computing instructions configured to run at one or more processors and stored at one or more non-transitory computer-readable media, the method comprising:
   tracking first data comprising responses by users to email campaigns, each of the responses comprising whether or not a user of the users clicked on an email of the email campaigns;
   generating a user feature set for the users, the user feature set comprising personal features of each of the users and online activity history for each of the users across a first set of time periods comprising multiple different time periods, wherein the personal features of each of the users in the user feature set comprise, for each of the multiple different time periods, a location of the user, a brand affinity of the user, and a price affinity of the user;
   generating an email feature set for multiple different emails in the email campaigns, the email feature set comprising a respective time sent for each of the multiple different emails in the email campaigns, wherein the email feature set further comprises, for each of the multiple different emails in the email campaigns: a category of one or more items featured in the email, one or more brands of the one or more items featured in the email, and at least one of one or more discount values of the one or more items featured in the email or one or more special promotional values of the one or more items featured in the email;
   training a logistic regression model to create a trained model using the first data, the user feature set, and the email feature set to provide a probability of a user of the users clicking on an email of the multiple different emails within each time period of a second set of time periods, further comprising:
      for a past email of the email campaigns sent within a time period of the second set of time periods, training the logistic regression model using (a) the user feature set for the past email and the email feature set for the past email as input predictor variables for the logistic regression model, and (b) the first data for the past email as an output dependent variable for the logistic regression model; and
   triggering sending a first email of the email campaigns to a first user of the users at a selected time period of the second set of time periods based at least in part on the trained model, further comprising:
      determining a maximum probability score from among probability scores across the multiple different emails of the email campaigns for the selected time period, wherein the first email corresponds to the maximum probability score, and wherein the maximum probability score represents a probability of the first user clicking on the first email within the selected time period; and
      triggering sending the first email to the first user at the selected time period when the maximum probability score exceeds a predefined threshold probability score.

12. The method of claim 11, wherein the online activity history for each of the users comprises at least one of: add-to-carts, purchases, search activity, or item views in a category context.

13. The method of claim 11, wherein the online activity history for each user of the users comprises, for a last online website session of the each user, at least one of: a time of the last online website session, a cart state after the last online website session, or a last action performed by the each user in the last online website session.

14. The method of claim 11, wherein the first set of time periods comprises a first time period for a past 60 days, a second time period for a past 30 days, a third time period for a past 7 days, a fourth time period for a past 1 day, and a fifth time period for a current online session.

15. The method of claim 11, wherein the personal features of the each of the users further comprises: an age of the user, and a gender of the user.

16. The method of claim 11, wherein each respective email of the multiple different emails of the email campaigns comprises one or more hyperlinks to the one or more items.

17. The method of claim 16, wherein the email feature set further comprises, for the each respective email of the multiple different emails in the email campaigns: a location to which the each respective email was sent, or a gender to which the each respective email was sent.

18. The method of claim 11, wherein triggering sending the first email to the first user at the selected time period comprises:
   selecting the selected time period from among the second set of time periods; and
   generating a probability score that the first user will click on an email for each of the multiple different emails of the email campaigns at the selected time period, using the logistic regression model.

19. The method of claim 11, wherein the personal features of the each of the users is determined based at least in part a purchase history of each of the users at brick-and-mortar stores.

20. The method of claim 11, wherein the email feature set further comprises, for each of the multiple different emails in the email campaigns: one or more discount values of the one or more items featured in the email and one or more special promotional values of the one or more items featured in the email.

* * * * *